April 4, 1950 M. L. MAGES 2,502,626
ELECTRONIC METAL LOCATOR
Filed Jan. 12, 1946 3 Sheets-Sheet 1

Inventor
Morris L. Mages
by The Firm of Charles H. Hill
Attys.

Inventor
Morris L. Mages
by The Firm of Charles W. Hills Attys.

April 4, 1950  M. L. MAGES  2,502,626
ELECTRONIC METAL LOCATOR
Filed Jan. 12, 1946  3 Sheets-Sheet 3

Inventor
Morris L. Mages
by The Firm of Charles W. Hills
Attys.

Patented Apr. 4, 1950

2,502,626

UNITED STATES PATENT OFFICE 2,502,626

ELECTRONIC METAL LOCATOR

Morris L. Mages, Chicago, Ill., assignor to Magnaflux Corporation, Chicago, Ill., a corporation of Delaware Application January 12, 1946, Serial No. 640,992

4 Claims. (Cl. 175—183)

This invention relates to metal locating apparatus, more specifically to apparatus for detecting the presence and location of paramagnetic metals in an object under inspection, for example, for detecting the location of nails embedded in an automobile tire, although the invention has other applications such as that of locating tramp iron in non-magnetic material carried on a belt conveyor or the like and numerous other similar applications wherein it is desired to detect the presence and location of paramagnetic materials.

This invention is an improvement over my copending application, filed August 23, 1945, Serial No. 612,264, entitled "Metal locator," now abandoned.

In the past, the location of nails or other paramagnetic objects in tires has been a tedious task and visual methods have generally been relied upon, however oftentimes small nails become lodged in tire casings and escape visual detection and which if left therein will gradually creep and eventually puncture the tube and cause a blow-out.

An object of this invention is to provide electrical apparatus for detecting the presence and location of a paramagnetic body in an object under test.

A more specific object of this invention is to provide a relatively simple and reliable portable electrical apparatus for scanning elemental areas of a tire or other object under test for the possible presence of paramagnetic materials such as nails.

A still more specific object of this invention is to provide an alternating current system including a probe containing balanced coils for normally developing equal and opposite voltages but which become unbalanced if a paramagnetic material comes in the vicinity of one of the coils, which unbalance is detected by a suitable meter.

A further specific object of this invention is to provide a portable metal locating apparatus including a sensitive metering circuit which is energized by alternating current and wherein the values of pulsating currents derived from the metal detecting circuit and from the meter-energizing alternating current source are simultaneously read as the result of the integrating action of the meter circuit.

A more specific object of this invention is to provide a portable metal locating apparatus including two electromagnetic probes, one for determining the general locality of a magnetic metal and the other for determining the specific or exact locality of such metal.

Other objects and advantages will be apparent from a study of the following specification taken with the accompanying drawings wherein.

Figure 1:
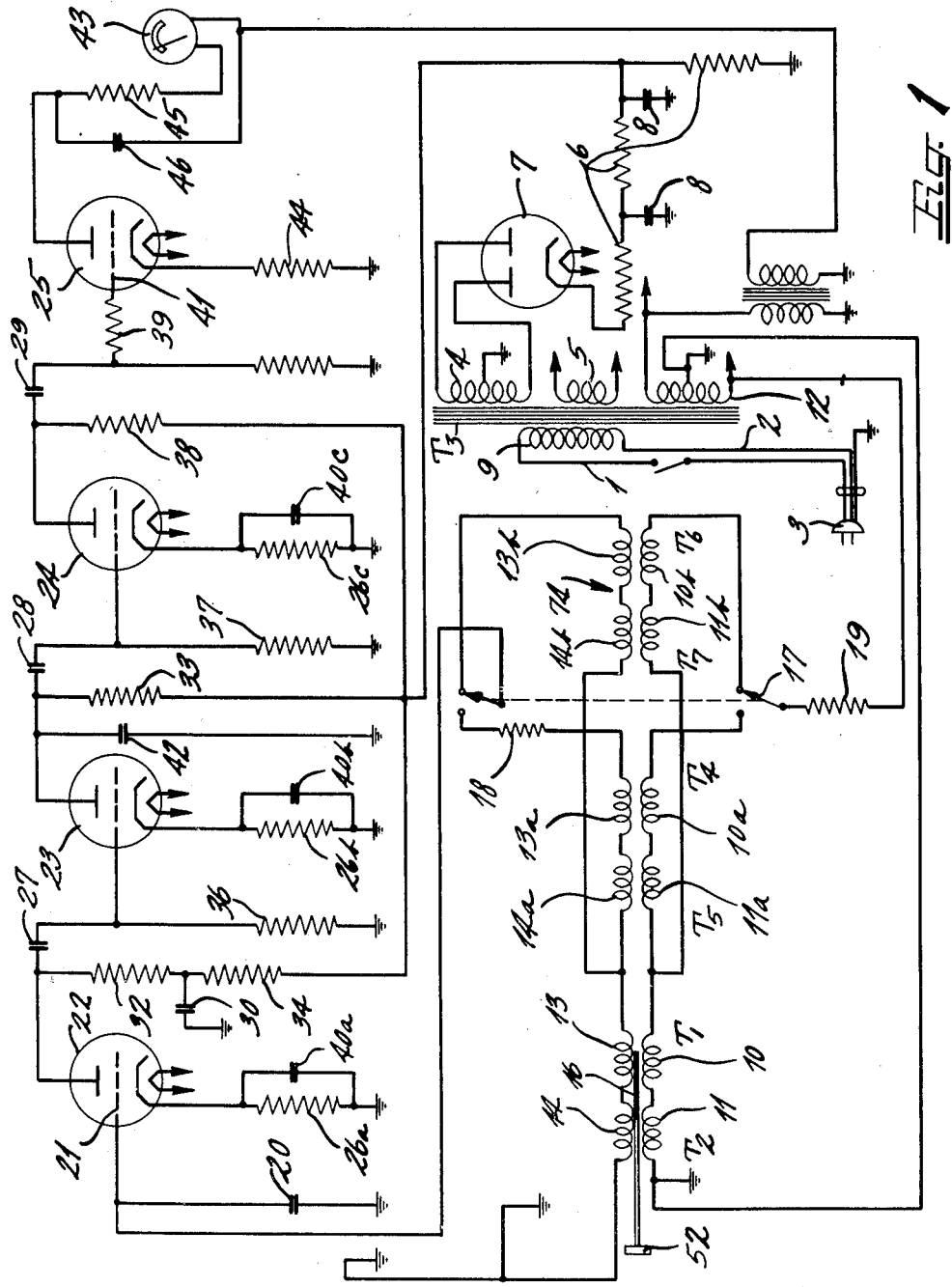
Fig. 1 is a schematic wiring diagram of a circuit which embodies the present invention.

Referring more particularly to Fig. 1 numerals 1 and 2 denote a pair of line conductors which are energized by a suitable source of alternating current such as the ordinary household, 110 volt–60 cycle alternating current system, by means of a plug 3. Primary winding 9 of a transformer $T_3$ is energized by said alternating current source. Transformer $T_3$ has a plurality of secondary windings 4, 5, and 12.

Winding 4 energizes a full wave rectifier of well known construction including full wave rectifier tube 7 having a pair of anodes connected to the extremities of winding 4, the midpoint of the winding being grounded, and having a cathode which is connected to a filter circuit 8 comprising a plurality of resistors 6 and condensers 8 connected as shown. The output of this filter circuit provides direct current or B+ voltage supply to the amplifier which amplifier will be described hereinafter.

The terminals of secondary winding 12 have connected in series therewith a pair of primary windings 10 and 11 of transformers $T_1$ and $T_2$, respectively, which transformers comprise a balance control assembly for the purpose of compensating for unbalance of the transformers in the detecting units or probes. A secondary winding 13 is associated with primary winding 10 of transformer $T_1$ whereas a secondary winding 14 is associated with primary winding 11 of transformer $T_2$. These secondary windings are differentially connected so that the induced voltages developed across the terminals thereof are in bucking relationship and normally cancel each other. Transformers $T_1$ and $T_2$ are preferably of identical construction so that complete cancellation of induced secondary voltages will be readily effected. There are, however, extraneous conditions which cause unbalance such as fixed bodies of iron in the vicinity of the head or induced voltages from extraneous sources. It is, therefore, desirable to provide means for compensating for such unbalancing. Such means is in the form of metallic balance plug 16 of magnetic material which may be moved axially of the coils between transformer $T_1$ and $T_2$ so as to effect exact magnetic balancing thereof and complete nullification of the induced secondary voltages. The specific details of construction of the balance control assembly including transformers $T_1$ and $T_2$, are shown in detail in Figures 3 and 4 and will be more fully described later.

Primary windings 10a and 11a of a spotter assembly or probe 77 are connected in series with primary windings 10 and 11 and have associated therewith secondary windings 13a and 14a of transformers $T_4$ and $T_5$, respectively. Transformers $T_4$ and $T_5$ are generally similar to transformers $T_1$ and $T_2$ in that the secondary windings 13a and 14a are connected in bucking relationship so as to normally cancel out the induced secondary voltages. As will appear more clearly hereinafter transformers $T_4$ and $T_5$ form a spotter assembly which is detachably mounted on the chassis but which may be readily removed therefrom and moved along the object being scanned for metallic particles by virtue of the fact that a long cable, say of the order of 6 feet, connects the spotter coil assembly to the main chassis.

Figure 5:
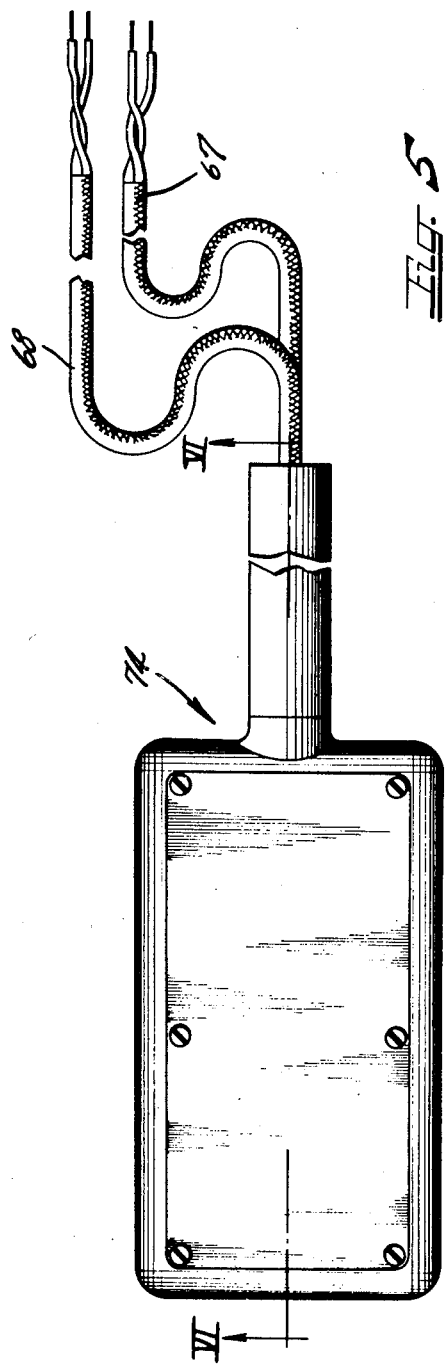
Fig. 5 is an enlarged front view of the head assembly shown in Fig. 1.
Figure 6:
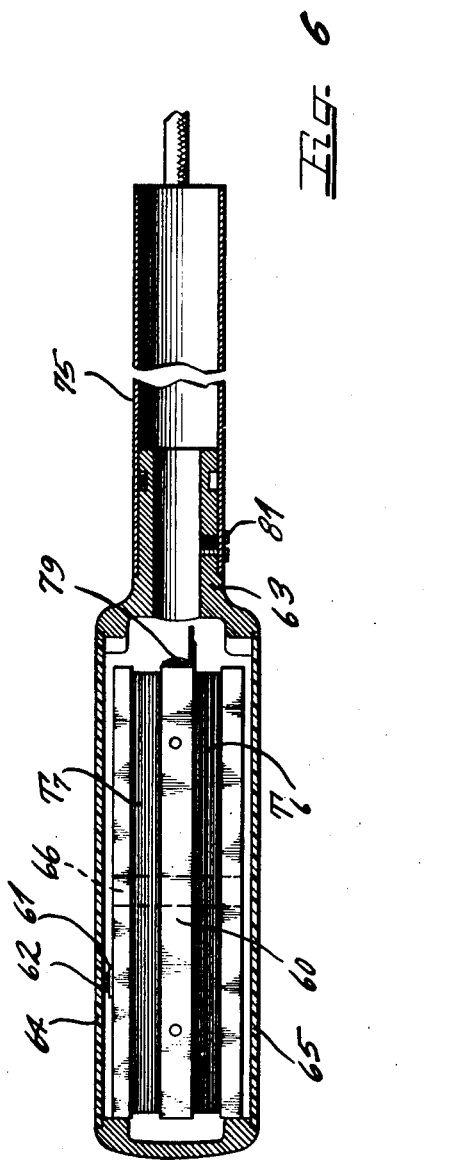
Fig. 6 is a cross-sectional view taken along lines V—V of Fig. 5.

By means of double-pole, double-throw switches 17 it is possible to substitute a head assembly or probe 74 for the spotter assembly. More specifically, by such switching arrangement it is possible to substitute in the circuit primary windings 10b and 11b of transformers $T_6$ and $T_7$, respectively, for primary windings 10a and 11a, respectively, as well as to substitute secondary windings 13b and 14b of transformers $T_6$ and $T_7$ for the secondary windings 13a and 14a of transformers $T_4$ and $T_5$, respectively. Transformers $T_6$ and $T_7$ are similar in construction to transformers $T_4$ and $T_5$, that is, their secondary windings 13b and 14b are differentially connected so that the induced voltages are normally in bucking relationship and cancel out therefore providing zero resultant voltage in the output terminals thereof. The details of the head assembly are shown in Figs. 5 and 6 and will be described more specifically later. A resistor 18 is provided in series with the spotter assembly secondary windings due to the fact that fewer number of turns are included in such windings as distinguished from the head assembly windings, that is, 13b and 14b. Resistor 31 may be of the order of 5,000 ohms and is also effective for eliminating harmonics in cooperation with a condenser 20 which may be of the order of 2 mfd. Resistor 18 and condenser 20 by-pass the high frequency harmonics to ground. A resistor 19 preferably of the order of 3 ohms, is connected in series with the various primary windings.

Inasmuch as common current flow takes place through the windings 10b and 11b when the switch 17 is in the position indicated in Figure 1, and like current flow takes place through the windings 10a and 11a when the switch 17 is in the opposite position, these windings operate to cause magnetic fluxes of like frequency and phase to encircle the secondary windings 13b and 14b and 13a and 14a, respectively.

It will thus be seen that the output of the secondary windings of the balance control assembly are connected in series with either the secondary windings of the spotter assembly or of the head assembly depending on the position of switch 17. The primary windings will be selectively in the input circuit of the amplifier so that unbalance which may exist either in the spotter assembly or the head assembly (depending upon which is connected in the input circuit) will be detected by the amplifier.

The amplifier is of the resistance capacitance coupled type including a plurality of stages comprising tubes 22, 23, and 24 illustrated as triodes, it being understood, however, that the tubes may be tetrodes, pentodes or of other multiple electrode types. The cathodes of tubes 22, 23, and 24 are self-biased as shown by means of resistors 26a, 26b and 26c by-passed by condensers 40a, 40b and 40c, respectively. Resistors 26a and 26b may be of the order of 5,000 ohms, whereas resistor 26c may be of the order of 2,500 ohms. As is well-known in the art, the by-pass resistors provide a low impedance path to ground and by-pass the alternating current components present in the plate circuit. While the parameters of the circuit may be varied through a wide range the following values are given as illustrative of one group of values that will give satisfactory operation. Coupling condensers 27, 28 and 29 may be of the order of .02 mfd. and filter condenser 30, of the order of 8 mfd. Plate load resistors 32 and 33 may be of the order to 500,000 ohms and the plate filter or decoupling resistor 34 of the order of 100,000 ohms, and grid leak resistors 36 and 37 may be of the order of 1 megohm and the decoupling or plate filter resistor 38 of the order of 50,000 ohms. Resistor 39 which is provided in the grid circuit of the indicator or voltmeter tube 25 to reduce parasitic oscillations and to reduce the grid current normally flowing in tube 25 may be of the order of 500,000 ohms.

Tubes 22 and 23 may be of any suitable type such as type 6SF5 and tubes 24 and 25 may be of the 6J5 type. As will be readily apparent from the diagram, tubes 22, 23, and 24 are connected in cascade in a normal manner so as to provide suitable voltage amplification for the purpose of controlling the input grid 41 of tube 25.

A phase shifting condenser 42 is provided across the output of tube 23 to compensate for the slight phase shift over and above the 180 degrees phase shift that is inherent in each of the various stages of the amplifier. A milliammeter 43 is connected in the plate circuit of tube 25. The plate circuit also includes resistor 44 which may be of the order of 1,500 ohms and a resistor-condenser combination 45—46, the purpose of which combination is to damp the meter and prevent vibration of the needle otherwise caused by the alternating current in the plate circuit. In other words, resistor-condenser combination 45—46 provides a suitable time constant so as to smooth out A. C. fluctuations much in the same manner as a filter circuit in a full wave rectifier circuit.

The operation of the device is as follows: Assume that the switch 17 is in the position indicated so that the head assembly 74 is in circuit relationship with the balance control assembly and the spotter assembly 77 is eliminated from the circuit. Assume further that the device is moved to a position opposite the object to be tested and that the balance control assembly is adjusted by suitable positioning of metallic plug 16 so that the induced secondary voltages in windings 13 and 14 exactly cancel unbalanced portion of the induced secondary voltages in windings 13b and 14b. In this condition no voltage is applied to control electrode 21 of electron discharge device 22. Now if the head were moved relative to the object such as a tire to be scanned or if the object is moved relative to the head then as long as no magnetic particle appears in the object, exact balance of the induced voltages in the secondaries 13b and 14b of the transformers will be maintained and will provide zero voltage output, or, in other words, no signal voltage will be applied to the input terminals of the amplifier. However, if the head assembly should come into the vicinity of a nail or other magnetic particle imbedded in the tire or object being scanned, magnetic unbalance will occur and the induced secondary voltages will be unequal hence a definite voltage signal will appear across the input terminals of the amplifier. As is well-known in the art a 180° shift in phase will occur in each stage of the amplifier hence for 3 stages the phase relationship would be the same as in the first stage. The ultimate effect of the presence of such magnetic material would be to cause a change of current in the plate circuit of the tube 25. This deflection of the meter permits detection of the presence of the magnetic particle.

In order to determine the exact location of the metallic particle the spotter assembly is substituted for the head assembly in the circuit by mere switching of switch 17 to the left as illustrated so as to tie in the spotter assembly with the balance control circuit. The spotter assembly is now manually moved relative the object under test and in the general vicinity previously indicated by the scanning function of the head assembly. Again as in the case of the head assembly, when the meter 43 changes by a maximum amount this will be an indication that the exact location of the metal particle has been found. Hence the object under test may be suitably marked. By providing a hole through the center of the spotter head casing coaxially of the windings it is possible to suitably mark the object by pencil, crayon or the like.

Figure 2:
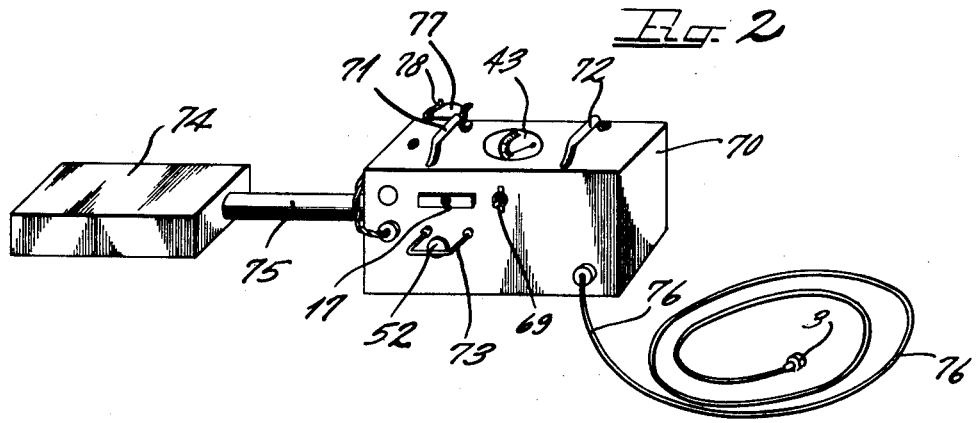
Fig. 2 is a perspective view of housing structure embodying the circuit shown in Fig. 1.

Fig. 2 shows a complete assembly including all the parts of the circuit illustrated in Fig. 1. The chassis 70 may be readily carried by means of a pair of handles 71 and 72. Meter 43 is mounted on the top thereof for indicating magnetic unbalance such as caused by the presence of metallic particles. A balance adjusting knob 52 is provided which is protected by means of a handle 73. A head assembly 74 included in a rectangular enclosure or frame extends from the chassis and is rotatably mounted with respect thereto by means of a sleeve bearing 75. Switch 17 selects either the spotter or head assembly whereas switch 69 is the "on-off" switch. A flexible conductor 76 extends from the chassis and has a suitable plug 3 at the end thereof to form a connection to a suitable alternating current source. A spotter assembly 77 is mounted on suitable clamps 78 extending from the outside surface of the box. Since the spotter assembly is connected by a long flexible cable to the chassis it is possible to readily detach the spotter from the chassis and manually move it along the surface of the tire or in the vicinity of any other object to be scanned.

Figure 3:
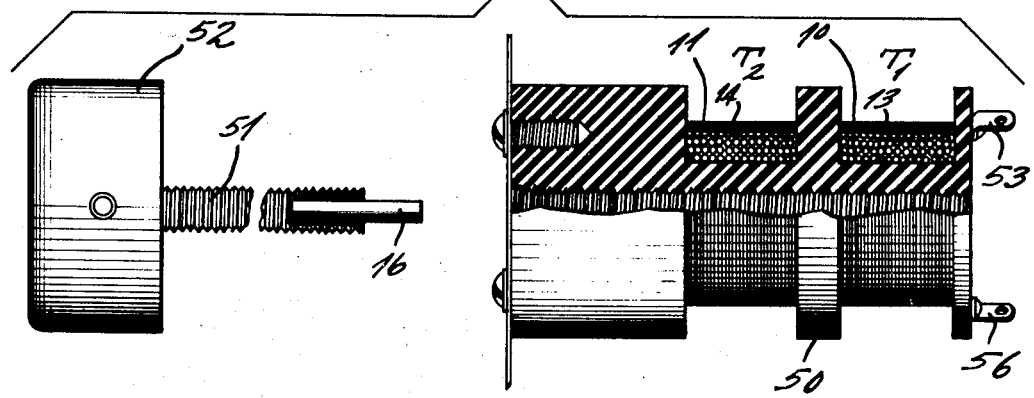
Fig. 3 is an enlarged exploded view of the balance control assembly shown in Fig. 1.
Figure 4:
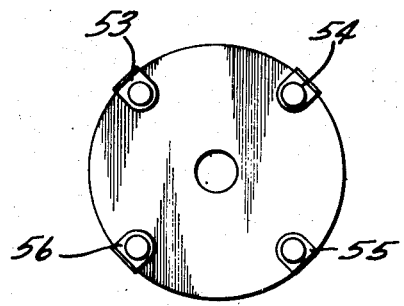
Fig. 4 is a side view of the structure shown in Fig. 3.

Fig. 3 shows the details of the balance control transformers $T_1$ and $T_2$. The primaries of these transformer windings are wound upon a non-magnetic core 50 of fibre or other suitable material and the secondary windings are wound around the primary windings. The core is axially threaded so as to accommodate a screw threaded stud or shank 51 of brass or other suitable non-magnetic material which may be screwed into the core by manually turning of a knob 52. Upon the end of the stud or shank 51 is an insert or plug of iron or other magnetic material which may be longitudinally propelled axially of and between the coils, of transformers $T_1$ and $T_2$ so as to effect a balance adjustment of the coils in the balance control assembly. At the end of core 50 a pair of primary winding terminals 53 and 54 and a pair of secondary winding terminals 55 and 56 are provided for connection to a suitable flexible conductor.

Fig. 5 and Fig. 6 show the head assembly 74 including transformers $T_6$ and $T_7$. A non-metallic core 60 of plywood or other suitable material has mounted thereon the pair of primary windings of transformers $T_6$ and $T_7$, the secondary windings being mounted thereabout. A washer 61 of iron or other suitable magnetic material which is screwed into the core 60 by a brass screw 62, for example, may be used to effect exact magnetic balance of the coils. That is to say by suitably positioning the washer, exact magnetic balance may be obtained. The head assembly also includes a frame or housing 63 of aluminum or other material which surrounds the transformer coils. A pair of cover plates 64 and 65 of a plastic composition or other suitable non-magnetic material complete the enclosure for the transformer windings of the head assembly. The core also includes a copper slug 66 axially thereof to effect further adjustment namely of phase an amplitude due to eddy currents formed in the enclosure. In other words, the copper slug 66 acts as a short circuited secondary winding. Suitable terminals such as 79 are provided for the transformer windings for connection to the terminals of a pair of flexible conductors 67 and 68. A shank portion of frame 63 is telescoped within a sleeve bearing 75 and is adjustably fastened thereto by screw 81. It will be readily apparent that the entire head assembly 74 may be rotated about the axis of sleeve bearing 75 to suitably adjust the head assembly with respect to the surface of the object being scanned.

The spotter assembly or probe 77 is preferably very similar in appearance to head 74 except that the spotter assembly will be smaller and the transformer windings will have fewer turns. It is desirable, however, to provide holes through the cover plates corresponding to cover plates 64 and 65 in registry with the axis of the windings so that when the spotter assembly is moved to a position on the surface of the tire indicated by maximum deflection of meter 43, thus revealing that the spotter assembly is adjacent the exact position of the metallic particle embedded in the tire or other object being scanned, then a crayon or pencil may be extended through the openings and a mark placed on the tire to indicate such exact position.

Thus it will be seen that I have provided an efficient, portable metal locating device that enables, by successive use of two different probes, to first find the general location and then the specific location of a magnetic particle embedded in a tire or other object under study.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. An apparatus for detecting the presence and location of a magnetic object, including a first probe having a pair of spaced windings, means to produce magnetic fluxes of like phase and frequency encircling said windings, first elements to produce a voltage determined by the difference between the voltages induced in said windings, a second probe having a pair of spaced windings of smaller number of turns than the windings in said first probe, means to produce magnetic fluxes of like phase and frequency encircling said windings, second elements to produce a voltage determined by the difference between the voltages induced in said windings, an indicator, means selectively operable to connect said indicator to said first elements or said second elements, an impedance, said last means connecting said indicator directly across said first elements and across said second elements in series with said impedance.

2. An assembly for use in detecting the presence of magnetic particles comprising a pair of probes each containing a pair of transformers, the transformers in one of said probes having a smaller number of secondary turns than the other, a balance control assembly comprising a pair of transformers having an adjustable magnetic member to alter their relative output voltages, switch means selectively operable into two positions to connect the primary windings of the transformers of the balance control assembly in series with the primary of a selected probe, and to connect the secondary windings of said balance control assembly in series with the secondaries of said probe whereby the induced voltages in each pair of secondary windings oppose each other, said transformers being so proportioned that in either condition of said switching means, the total voltage across the secondary windings of the probes may be reduced to zero by adjustment of said magnetic member, whereby the presence of the magnetc particles may be determined roughly by variations in voltage across said secondary windings when the probe having the larger number of turns in its secondaries is brought into proximity with said particles, and more exactly by the variations in voltage across said secondaries of the probe containing the smaller number of turns.

3. An assembly for use in detecting the presence of magnetic particles comprising a pair of probes each containing a pair of transformers, one of said probes having a smaller number of secondary turns than the other, a balance control assembly comprising a pair of transformers having their windings wound about a single core and having an adjustable magnetic member movable along said core to alter their respective output voltages, switch means selectively operable into two positions, in either position to connect the primary windings of the transformers of the balance control assembly in series with the primaries of a selected probe, and to connect the secondary windings of said balance control assembly in series with said secondaries of said probe whereby the induced voltages in each pair of secondary windings oppose each other, said transformers being so proportioned that in either condition of said switching means, the total voltage across the secondary windings of the probe may be reduced to zero by adjustment of said magnetic member, whereby the presence of the magnetic particles may be determined roughly by variations in voltage across said secondary windings when the probe having the larger number of turns in its secondaries is brought into proximity with said particles, and more exactly by variations in voltage across said secondaries of the probe containing the smaller number of turns.

4. An assembly for use in detecting the presence of magnetic particles comprising a pair of probes each containing a pair of transformers, one of said probes being rotatably mounted within said assembly and the other of said probes having a smaller number of secondary turns in its transformers than the rotatable probe, a balance control assembly comprising a pair of transformers having an adjustable magnetic member to alter their relative output voltages, switch means selectively operable into two positions, in each position to connect the primary windings of the transformers of the balance control assembly in series with the primaries of a selected probe, and to connect the secondary windings of said balance control assembly in series with the secondaries of said probe whereby the induced voltages in each pair of secondary windings oppose each other, said transformers being so proportioned that in either condition of said switching means, the total voltage across the secondary windings of the probe may be reduced to zero by adjustment of said magnetic member, whereby the presence of the magnetic particles may be determined roughly by variations in voltages across said secondary windings when the probe having the larger number of turns in its secondaries is brought into proximity with said particles, and more exactly by the variations in voltage across said secondaries of the probe containing the smaller number of turns.

MORRIS L. MAGES.

REFERENCES CITED

The following references are of record in the file of this patent:

UNITED STATES PATENTS

| Number | Name | Date |
| --- | --- | --- |
| 2,109,455 | Barnes et al. | Mar. 1, 1938 |
| 2,317,718 | Barnes et al. | Apr. 27, 1943 |
| 2,321,355 | Berman | June 8, 1943 |
| 2,321,356 | Berman | June 8, 1943 |
| 2,437,455 | Berman | Mar. 9, 1948 |